(12) United States Patent
Everett et al.

(10) Patent No.: US 6,654,127 B2
(45) Date of Patent: Nov. 25, 2003

(54) OPTICAL DELAY LINE

(75) Inventors: Matt J. Everett, Livermore, CA (US); Jay Wei, Fremont, CA (US)

(73) Assignee: Carl Zeiss Ophthalmic Systems, Inc., Dublin, CA (US)

(*) Notice: Subject to any disclaimer, the term of this patent is extended or adjusted under 35 U.S.C. 154(b) by 0 days.

(21) Appl. No.: 09/797,748

(22) Filed: Mar. 1, 2001

(65) Prior Publication Data

US 2002/0122182 A1 Sep. 5, 2002

(51) Int. Cl.[7] ................................................. G01B 9/02
(52) U.S. Cl. ........................ 356/479; 356/497; 359/287; 359/285; 359/331
(58) Field of Search ................................ 356/479, 497; 359/285, 287, 331

(56) References Cited

U.S. PATENT DOCUMENTS

| | | | |
|---|---|---|---|
| 5,233,405 A | * 8/1993 | Wildnauer et al. | 356/333 |
| 5,303,026 A | * 4/1994 | Strobl et al. | 356/318 |
| 5,321,501 A | 6/1994 | Swanson et al. | 356/345 |
| 5,459,570 A | 10/1995 | Swanson et al. | 356/345 |
| 5,461,687 A | * 10/1995 | Brock | 385/37 |
| 5,907,404 A | * 5/1999 | Marron et al. | 356/360 |
| 5,930,038 A | * 7/1999 | Swan | 359/484 |
| 5,956,355 A | * 9/1999 | Swanson et al. | 372/20 |
| 6,111,645 A | 8/2000 | Tearney et al. | 356/484 |
| 6,134,003 A | 10/2000 | Tearney et al. | 356/450 |
| 6,282,011 B1 | * 8/2001 | Tearney et al. | 359/287 |
| 6,341,036 B1 | * 1/2002 | Tearney et al. | 359/368 |
| 6,373,614 B1 | * 4/2002 | Miller | 359/237 |
| 6,421,164 B2 | * 7/2002 | Tearney et al. | 359/287 |
| 6,496,622 B1 | * 12/2002 | Hoose et al. | 385/37 |

OTHER PUBLICATIONS

"Optical Coherence Tomography" by D. Huang et al., *Science*, vol. 254, Nov. 22, 1991, pp. 1178–1181.

"High–speed phase– and group–delay scanning with a grating–based phase control delay line" by G. J. Tearney et al., *Optics Letters*, vol. 22, No. 23, Dec. 1, 1997, pp. 1811–1813.

* cited by examiner

*Primary Examiner*—David V. Bruce
*Assistant Examiner*—Allen C. Ho
(74) *Attorney, Agent, or Firm*—Michael B. Einschlag

(57) ABSTRACT

One embodiment of the present invention is an optical delay line that comprises a plurality of optical elements in optical communication with each other, wherein: (a) at least one of the plurality of optical elements is capable of spatially dispersing a spectrum of an optical signal to provide a spatially dispersed optical signal; (b) at least one of the plurality of optical elements is adjustable to affect one or more of a phase delay and a group delay of an optical signal; and (c) at least one of the plurality of optical elements compensates for polarization introduced into the optical signal by others of the optical elements.

34 Claims, 2 Drawing Sheets

OPTICAL DELAY LINE

TECHNICAL FIELD OF THE INVENTION

The present invention pertains to optical delay lines. In particular, one embodiment of the present invention relates to a grating-based, phase control optical delay line used, for example and without limitation, in Optical Coherence Tomography ("OCT") and Optical Coherence Domain Reflectometry ("OCDR").

BACKGROUND OF THE INVENTION

A low coherence, optical interferometer has been used in various apparatuses to study scattering media. FIG. 4 shows a block diagram of an Optical Coherence Tomography ("OCT") system. As shown in FIG. 4, OCT system 50 includes an interferometer with reference path 5, sample path 10, splitter/combiner 15 (one embodiment of splitter/combiner 15 comprises a 50/50 beamsplitter, or a 3 dB coupler if the interferometer is embodied using optical fibers), low coherence radiation source 20, detector 25, and processor 30. Scanning optical delay line 35 (ODL 35) is located at an end of reference path 5 of the interferometer. As further shown in FIG. 4, sample path 10 includes probe module 40 to direct radiation to sample 45, and to collect radiation scattered from sample 45. As is still further shown in FIG. 4, detector 25 combines a sample beam reflected from sample 45, and a reference beam reflected by scanning ODL line 35. Then, whenever an optical path length mismatch between sample path 10 and reference path 5 is less than a coherence length of low coherence radiation source 20, interference between the sample beam and the reference beam occurs. As is well known in the art, if the optical path length of the reference beam is known when detector 25 senses the interference signal, the optical path length of the sample beam can be measured within the accuracy of the coherence length of the low coherence radiation source.

Several designs of an optical delay line for use in the reference path have been disclosed in the art. As described in an article entitled "Optical Coherence Tomography" by Huang et al. in *Science,* Vol. 254, 1991, pp. 1178–1181, a mirror is used to reflect the reference beam back to the detector. In accordance with this article, depth information from the sample medium is acquired by varying the optical path length of the reference path by moving the mirror using a stepper motor. U.S. Pat. No. 5,321,501 (Swanson et al.) discloses a change to the design of Huang et al. in which the mirror is replaced by a retroreflector to improve optical alignment stability, and the stepper motor is replaced by a galvanometer to increase the scan speed to a degree where tomographical images of living tissue became feasible.

U.S. Pat. No. 6,111,645 (Tearney et al.) discloses a change to the design of Swanson et al. in which the moving retroreflector is replaced by a grating-based, phase control, optical delay line. U.S. Pat. No. 6,111,645 is incorporated by reference herein. This design change further increases the scanning speed over that disclosed in Swanson et al., and also enables independent control of the phase and group delay of produced by the reference path. However, the grating-based, phase control, optical delay line disclosed by Tearney et al. has been limited thusfar to use in a laboratory environment.

In light of the above, there is a need for an optical delay line that can provide high scanning rates, and that is suitable for use in optical interferometers to provide tomographic images of living tissue.

SUMMARY OF THE INVENTION

Embodiments of the present invention advantageously satisfy the above-identified need in the art. In particular, one embodiment of the present invention is an optical delay line ("ODL") that is suitable for use in optical interferometers to provide tomographic images of living tissue. Specifically, a first embodiment of the present invention is an optical delay line that comprises a plurality of optical elements in optical communication with each other, wherein: (a) at least one of the plurality of optical elements is capable of spatially dispersing a spectrum of an optical signal to provide a spatially dispersed optical signal; (b) at least one of the plurality of optical elements is adjustable to affect one or more of a phase delay and a group delay of an optical signal; and (c) at least one of the plurality of optical elements compensates for polarization introduced into the optical signal by others of the optical elements. In addition, a second embodiment of the present invention is an optical delay line that comprises: (a) a collimator lens system; (b) a grating disposed to receive radiation output from the collimator lens system; (c) a collector lens system disposed to receive at least a portion of radiation diffracted by the grating; (d) a rotatable mirror disposed substantially at a back focal plane of the collector lens system; and (e) a reflector disposed to reflect at least a portion of radiation diffracted by the grating; wherein the collimator lens system, the reflector, and an output end of an optical fiber are affixed in a unit, which unit is movable by a translation mechanism.

Another embodiment of the present invention is an optical interferometric imaging system to be used, for example and without limitation, in a clinical setting. In particular, one embodiment of the present invention is an optical interferometric imaging system for imaging a sample that comprises: (a) an optical source capable of producing an optical signal having an optical spectrum; (b) an interferometer in communication with the optical source; (c) a detector in optical communication with the interferometer; and (d) an optical delay line in optical communication with the interferometer that comprises a plurality of optical elements in optical communication with each other, wherein: (i) at least one of the plurality of optical elements is capable of spatially dispersing a spectrum of the optical signal to provide a spatially dispersed optical signal, (ii) at least one of the plurality of optical elements is adjustable to affect one or more of a phase delay and a group delay of the optical signal, and (iii) at least one of the plurality of optical elements compensates for polarization introduced into the optical signal by others of the optical elements.

DETAILED DESCRIPTION

Figure 1:
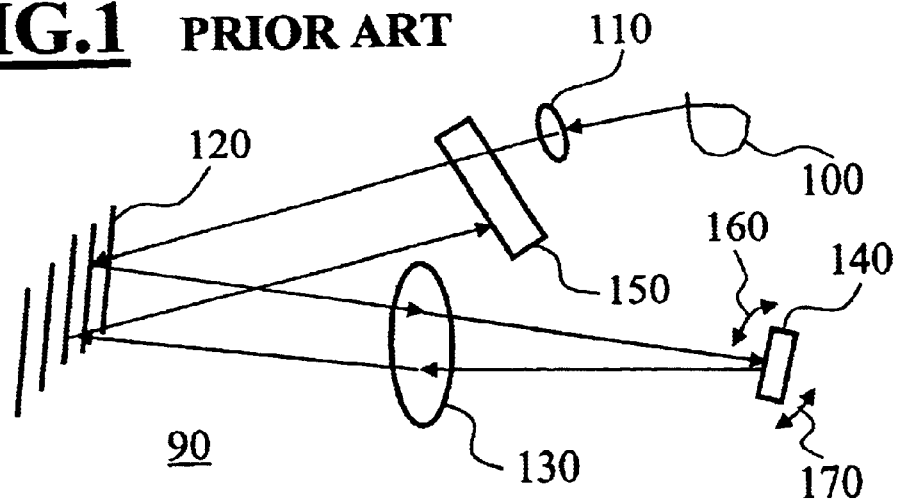
FIG. 1 shows, in schematic form, a grating-based, phase control, optical delay line disclosed in U.S. Pat. No. 6,111,645 (G. J. Tearney et al.)

FIG. 1 shows, in schematic form, grating-based, phase control, optical delay line 90 that is one embodiment of an optical delay line ("ODL") disclosed in U.S. Pat. No. 6,111,645 (the '645 patent); see FIG. 13 of the '645 patent. As shown in FIG. 1, radiation output from single mode optical fiber 100 is collimated by lens system 110 (although lens system 110 is shown as a single lens, those of ordinary skill in the art readily appreciate that lens system 110 may comprise a multiplicity of lenses), and is directed to impinge upon grating 120 (grating 120 has a predetermined grating groove density) at a grating input angle (for example, an angle Θ with respect to a normal to grating 120). Grating 120 disperses the beam of radiation that impinges thereon into different spectral frequency or wavelength components that are collected, and focused by lens system 130 (although lens system 130 is shown as a single lens, those of ordinary skill in the art readily appreciate that lens system 130 may comprise a multiplicity of lenses) onto mirror 140. The optical axis of lens system 130 is disposed at a grating output angle (for example, an angle Θ with respect to a normal to grating 120), and mirror 140 is disposed substantially at the back focal plane of lens 130.

As further shown in FIG. 1, mirror 140 directs reflected radiation back through lens system 130 to grating 120, and from there, to double-pass mirror 150. The radiation output from grating 120 is substantially orthogonal to mirror 150, and as a result, it is reflected all the way back through ODL 90 into single mode optical fiber 100.

As described in the '645 patent, the Fourier transform of the spectrally dispersed beam of radiation is present at mirror 140. When the surface of mirror 140 is disposed at an angle (for example, an angle γ with respect to a normal to the optical axis of lens 130), a phase ramp, or linear phase shift, is applied to the spectrum across mirror 140. Then, an inverse Fourier transform of the spectrum is achieved as the beam propagates back through lens system 130 towards grating 120. Since the inverse Fourier transform of a linear phase shift is a time delay, a temporal group delay of the beam is produced.

As further disclosed in the '645 patent, alteration of one or more of: (a) the grating groove density, the grating input angle $\Theta_i$, and the grating output angle $\Theta_d$ of grating 120; or (b) the angle at which mirror 140 is disposed (see above) produces a change in the optical group delay and phase delay, see FIG. 14 of the '645 patent.

Figure 4:
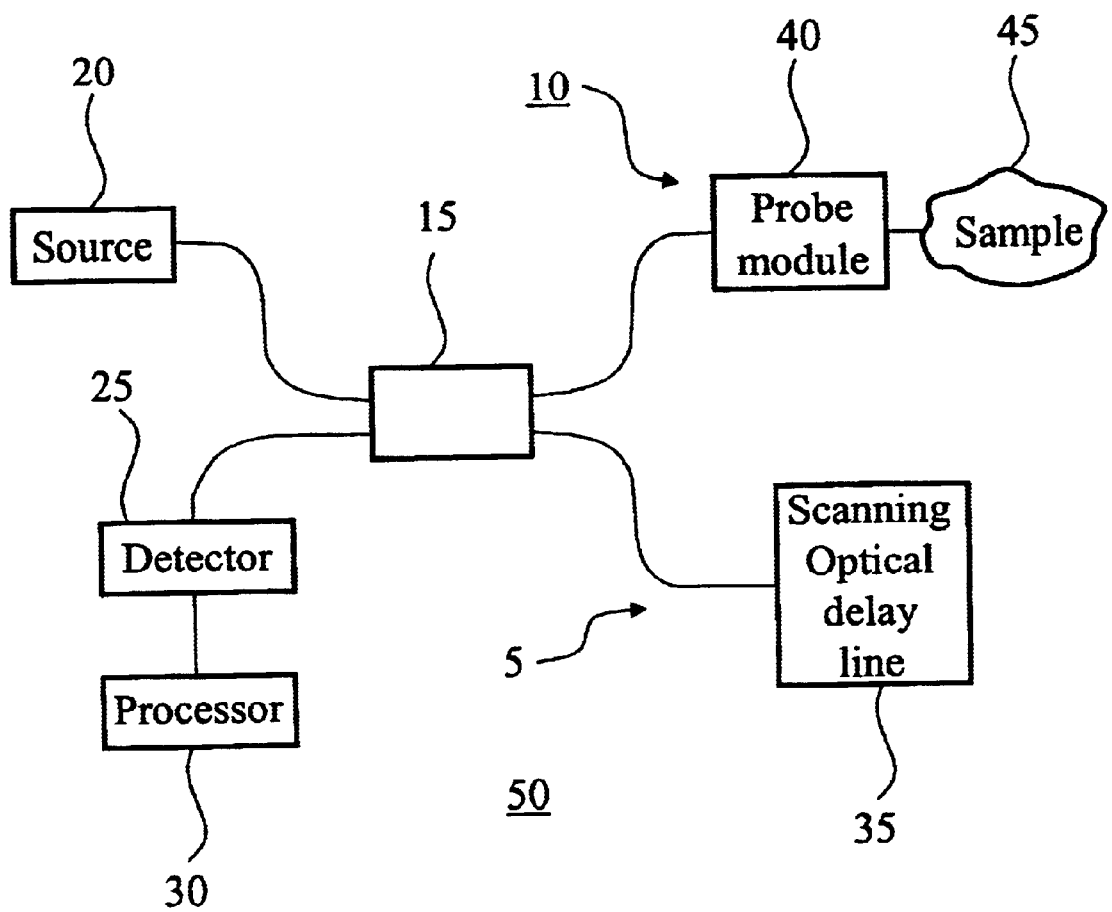
FIG. 4 shows a block diagram of an optical coherence tomography ("OCT") system.

Thus, if the angle at which mirror 140 is disposed, as shown in FIG. 1, is rapidly scanned, a time dependent, optical group delay line is produced. Then, for example, ODL 90 can be inserted into the reference path of a low coherence optical interferometer (such as that disclosed in the '645 patent and described in the Background of the Invention in conjunction with FIG. 4) to perform high speed optical coherence tomography ("OCT"). Since the phase delay and group delay are adjustable, the modulation frequency which is produced in interferometric imaging techniques can be controlled, thereby simplifying detection electronics. This is especially important for detection scenarios which involve direct electronic digitization (A/D conversion) of a detected optical interference signal.

Referring to FIG. 1, mirror 140 is rotated along a direction indicated by arrows 160 and 170. Mirror 140 is rotated by a rotation mechanism (not shown). The rotation mechanism can be fabricated in accordance with any one of a number of rotation mechanisms that are well known to those of ordinary skill in the art such as, for example and without limitation, a galvanometer rotation mechanism (for example, the mirror is placed on a shaft of a galvanometer), a resonant scanner, a rotating polygon mirror (see FIG. 8 of the '645 patent), and a piezoelectric mirror scanner.

In addition to the above (where the angle of mirror 140 produces a change in group delay), by offsetting the center of rotation of mirror 140 with respect to the center wavelength of the spectrum of the beam of radiation, the phase control device can be used to adjust the phase delay and the group delay independently. Moreover, if the center wavelength of the spectrum of the beam of radiation output from grating 120 and lens system 130 is incident on the center of rotation of mirror 140, group delay is produced without changing the phase delay. Then, in an OCT, no modulation frequency is applied to the local oscillator, even though a scanning linear group delay is produced. Thus, the interferometric signal consists of the envelope of the autocorrelation function without any modulation. This can be useful for OCT imaging systems that perform homodyne detection. If an independent phase modulation is applied to the local oscillator, the system would be capable of scanning at different speeds without changing the center frequency of the band pass filter before demodulation. A phase diversity homodyne detection system would be useful for OCT in this instance.

Furthermore, by translating mirror 140 so that the center wavelength is offset from the axis of rotation, an arbitrary modulation frequency can be applied to the local oscillator. This enables complete control over the center frequency of the local oscillator. The modulation frequency (i.e., phase delay) may be varied by simply translating mirror 140 perpendicular to the optical axis of the beam. The range of center modulation frequencies that may be achieved is only limited by spectral vignetting due to the finite size of mirror 140.

In accordance with the above-described approximation, the group-phase delay independence of the ODL is an advantage whenever mirror 140 has an axis of rotation that intersects the mirror surface. When the mirror surface is separated from the axis of rotation, however, the group-delay and phase-delay properties are more complex. To an approximation, the group-delay is linear in angle but not in phase delay.

For example, while the change in group delay produced by a polygon scanning mirror is linear, the change in phase is quadratic as a function of time. Since the modulation frequency shifts linearly over the scan, a polygon scanning mirror cannot be used in conjunction with a demodulation method that incorporates a fixed band pass filter. The varying modulation frequency can be overcome, however, by using an alternative demodulation scheme, such as adaptive frequency mixing detection, where the frequency at which the demodulation is performed is varied to track the variation in the modulation frequency. Alternative phase control configurations, such as scanning the grating angle of incidence or the grating ruling density, also produce a nonlinear phase delay. As a result, these methods can only be used in conjunction with an adaptive frequency mixing demodulation scheme for OCT imaging applications.

In addition to enabling high speed group delay scanning, another advantage of the above described ODL for use in conjunction with OCT is the capability to compensate dispersion mismatch between the reference path and the sample path. This occurs as follows: whenever the distance L between lens system 130 and grating 120 is not one focal length, an additional wavelength dependent phase delay is added to a pulse, creating positive dispersion for L<focal length and negative dispersion for L>focal length. This property of the ODL enables compensation of a dispersion imbalance between the reference path and sample path in the OCT system by simply changing the lens-grating separation.

Despite the advantages discussed above, we have uncovered several problems with ODL 90 disclosed in U.S. Pat. No. 6,111,645. A first problem with ODL 90 arises because radiation is reflected four (4) times from grating 120. This problem arises because gratings typically have different reflectivities for S and P polarization states. For example, for a case where an S polarization state has a reflectivity of 67%, and where a P polarization state has a reflectivity of 47%, the relative optical efficiency of the P and S states, i.e., (P/S), for ODL 90 would be $(0.47/0.67)^4 = 0.24$.

This raises two issues. The first issue arises from the fact that a source of radiation may be coupled to ODL 90 through fiber optics. This is an issue because stress in fiber optics causes them to act as waveplates that modify the polarization state of radiation entering ODL 90. As a result, the optical efficiency of ODL 90 will change. For example, since stress in an optical fiber typically varies with temperature or movement of the optical fiber, power returning from ODL 90 will vary. Such a variation will make optimization of a detector system included in an optical interferometer in which ODL 90 is used difficult. The second issue arises because optimal detection of radiation reflected from a sample path in an optical interferometer requires that a polarization state in a reference path and a sample path be matched. For example, if there is no matching, a loss of P polarized radiation from the reference path will decrease detection of P polarized radiation from the sample path. Thus, if equal amounts of P and S polarized radiation are output from a 3 dB coupler (see the Background of the Invention), this effectively drops the sample path detection efficiency of the optical interferometer by 50%.

A second problem with ODL 90 arises because the optical path length of the reference path needs to be varied to match it to the optical path length of the sample path. This can be accomplished (referring to FIG. 1) by moving either collimator lens system 110 or mirror 150 in an axial direction. However, this is not practical because the slightest misalignment of either of these components causes significant transmission loss in ODL 90.

To eliminate the above-identified polarization dependent effects of ODL 90 disclosed in U.S. Pat. No. 6,111,645, and in accordance with one aspect of the present invention, a polarization dependent optical component is added to ODL 90 that substantially eliminates the polarization dependent effects of grating 120. Advantageously, this will enable a reference path (for example, reference path 5 in the low coherence optical interferometer shown in FIG. 4) to have approximately equal optical efficiency for S and P polarized states. One embodiment of such an optical component is an optical window that is placed in a reference path beam, at angle, to produce polarization dependent transmission.

Figure 2:
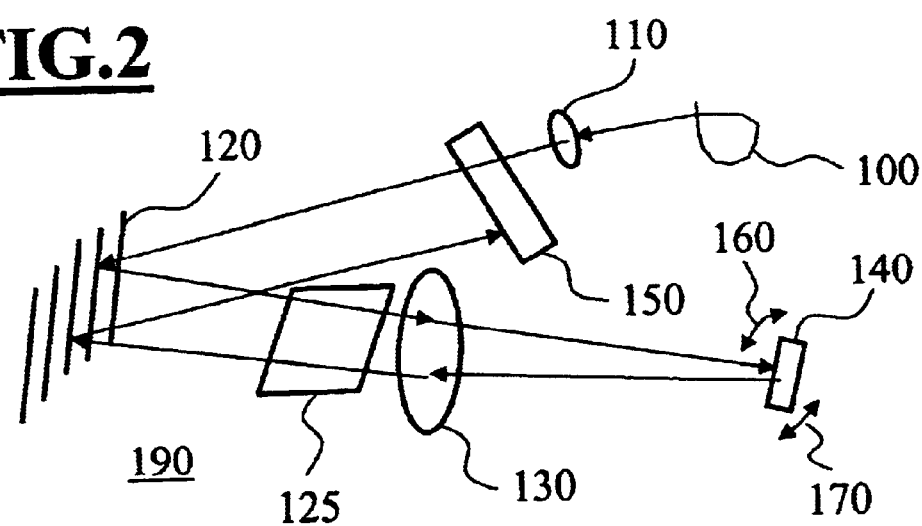
FIG. 2 shows, in schematic form, a grating-based, phase control, optical delay line fabricated in accordance with a first embodiment of the present invention.

FIG. 2 shows, in schematic form, grating-based, phase control, optical delay line 190 ("ODL 190") that is the same as ODL 90 shown in FIG. 1 with the addition of window 125. Window 125 may be fabricated from any transparent material such as a piece of glass, that can alter polarization. Further, as one of ordinary skill in the art can readily appreciate, window 125 may be disposed at various angles with respect to the beam of radiation passing therethrough to vary the polarization alteration effect. For example, the polarization transmission efficiency may vary as a function of angle differently for the S and P polarization states. Still further, in a preferred embodiment, front and back surfaces of window 125 may be slightly off from parallel to ensure that multiple reflections therefrom do not couple back into ODL 190.

Although FIG. 2 shows the use of a single piece of material to embody window 125, it is within the scope of the present invention that multiple windows may be used, for example, in series, to achieve sufficient discrimination between the two polarization states to be effective in substantially eliminating the polarization effect caused by grating 120. In a preferred embodiment, the angle of all windows used to provide window 125 may be disposed substantially at Brewster's angle to minimize loss in the P polarization state. We have demonstrated elimination of polarization dependent effects of ODL 90 by placing a microscope slide at near Brewster's angle such that the beam of radiation passes through it four (4) times (intersecting both the beam going to rotatable scanning mirror 140 and the offset beam returning therefrom).

As is well known, it is often necessary to attenuate power in the reference path of a low coherence optical interferometer to optimize sensitivity of the OCT system. In accordance with this aspect of the present invention, attenuation of the beam of radiation can be achieved simultaneously with polarization compensation if window 125 includes a neutral density optical attenuator, such neutral density optical attenuators are available from a wide variety of commercial sources.

Although the above-described embodiment of the present invention indicates that window 125 is placed so that a beam of radiation in ODL 190 passes therethrough four (4) times, the present invention is not so limited. In fact, embodiments of the present invention include embodiments where window 125 is distributed throughout beam paths of ODL 190 so that: (a) in some embodiments, a beam passes through window 125 two (2) times; (b) in some embodiments, a beam passes through one portion of a distributed embodiment of window 125 four (4) times, and another portion of a distributed embodiments of window 125 two (2) times; and (c) so forth.

Figure 3:
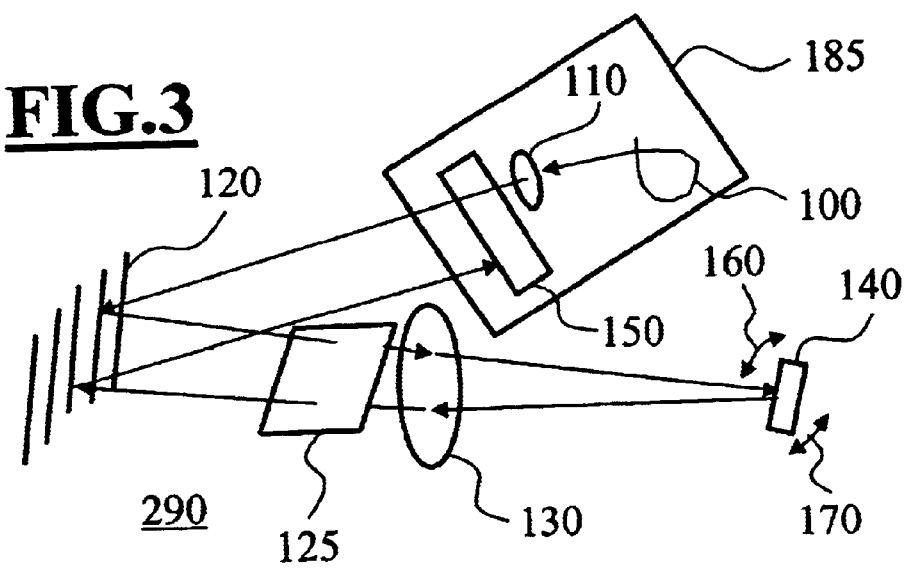
FIG. 3 shows, in schematic form, a grating-based, phase control, optical delay line fabricated in accordance with a second embodiment of the present invention.

As was described above, another problem with ODL 90 is a difficulty in maintaining alignment while adjusting the optical path length to compensate for differences in optical path length between a reference path and a sample path of a low coherence optical interferometer. This problem is solved in accordance with a second aspect of the present invention. FIG. 3 shows, in schematic form, grating-based, phase control, ODL 290 that is fabricated in accordance with the second aspect of the present invention. As shown in FIG. 3, ODL 290 is the same as ODL 190 shown in FIG. 2 with the addition that the tip of fiber 100, collimator lens system 110, and mirror 150 are mounted in fixture 185 so that they are moved as a unit in the axial direction to adjust path length. Fixture 185 can be moved by a translation mechanism, which translation mechanism can be fabricated using any translation mechanism (not shown) that is well known to those of ordinary skill in the art such as a stepper motor and a screw, a linear motor, and the like. This arrangement solves the alignment problem because of the following. Grating 120, lens system 130, and mirror 140, as a group, act as a retro-reflector. Thus, rays in the beam of radiation that leave collimator lens system 110 and hit mirror 150 are always parallel in a well aligned ODL 290. Hence, if mirror 150 is kept orthogonal to the beam of radiation leaving collimator lens 110, alignment of ODL 290 will be relatively insensitive to changes in the position or angle of this beam.

The inventive optical delay line can be incorporated into Low Coherence Interferometry (LCI), Optical Coherence Tomography (OCT), or other interferometric based optical ranging and imaging techniques. For example, the inventive optical delay line is used in OCT systems to enable high speed reference path optical path length scanning using heterodyne or homodyne detection. Such high speed OCT imaging can be used in a variety of applications (e.g., in vivo medical imaging in human tissue). Medical applications of the inventive optical delay line in OCT imaging include but are not limited to in vivo medical diagnostic imaging of the vascular system; gastrointestinal tract; urinary tract; respiratory tract; nervous system; embryonic tissue; OB/GYN tissue; and any other internal human organ systems. Other medical applications include a rapid scanning OCT system for performing guiding surgical intervention. The inventive optical delay line may be also used in OCT imaging for non-medical applications including imaging in biological specimens, materials, composite materials, semiconductors, semiconductor devices and packages, and other applications requiring high speed imaging.

Those skilled in the art will recognize that the foregoing description has been presented for the sake of illustration and description only. As such, it is not intended to be exhaustive or to limit the invention to the precise form disclosed. For example, embodiments of the present invention also include all of the grating-based, single or double-pass geometry apparatus disclosed in the '645 patent such as, without limitation: (a) the grating-based, phase control, optical delay line shown in a single pass configuration and a double-pass configuration, respectively, in FIGS. 1A and 1B of the '645 patent; (b) the grating-based, phase control, optical delay line using an acousto-optic modulator ("AOM") and a reflection grating to scan an input beam shown in FIG. 2 of the '645 patent (in FIG. 2, the AOM scans an incident angle Θ, and in another embodiment, a telescope is used between the AOM and the grating); (c) the grating-based, phase control, optical delay line using an acousto-optic modulator and a diffraction grating to scan an input beam shown in FIG. 3 of the '645 patent; (d) the grating-based, phase control, optical delay line using a scanning mirror to change the grating input angle shown FIG. 4 of the '645 patent (as described in the '645 patent, a telescope is disposed between the scanning mirror and the grating to prevent beam walk-off at the grating); (e) the grating-based, phase control, optical delay line using a steerable grating shown in FIG. 5 of the '645 patent; (f) the grating-based, phase control, optical delay line using a radially scanned, circular, holographic, optical element shown in FIG. 6 of the '645 patent; (g) the mirror configuration for pulse shaping shown in FIG. 11 of the '645 patent; (h) the grating-based, phase control, optical delay line in a double-pass configuration shown in FIG. 13 of the '645 patent; (i) the grating-based, phase control, optical delay line with elements that can be modified to change the scanning group delay shown in FIG. 14 of the '645 patent; (j) the grating-based, phase control, optical delay line using a scanning grating shown in FIG. 16 of the '645 patent; (k) the scanning, optical delay line apparatus using a rotating, circular, holographic, optical element to produce a scanning group delay shown in FIG. 17 of the '645 patent; (l) the scanning optical delay line apparatus using an acousto-optic modulator and a diffraction grating shown in FIG. 18 of the '645 patent; (m) the grating-based, phase control, optical delay line using a scanning mirror with its axis of rotation offset from the optical axis shown in FIG. 20 of the '645 patent; and (n) the grating-based, phase control, optical delay line using a polygon mirror with its axis of rotation offset from the optical axis shown in FIG. 21 of the '645 patent.

What is claimed is:

1. An optical delay line which comprises:
   a plurality of optical elements in optical communication with each other, wherein:
   at least one of the plurality of optical elements is capable of spatially dispersing a spectrum of an optical signal to provide a spatially dispersed optical signal;
   at least one of the plurality of optical elements is adjustable to affect one or more of a phase delay and a group delay of an optical signal; and
   at least one of the plurality of optical elements is a polarization dependent optical element that produces polarization dependent transmission that compensates for polarization dependence of the at least one of the optical elements that is capable of spatially dispersing a spectrum.

2. The optical delay line of claim 1, wherein at least one adjustable optical element repeatedly scans to produce a change of optical group delay and a time varying optical phase delay.

3. The optical delay line of claim 1 wherein the spatially dispersing element comprises a diffractive element.

4. The optical delay line of claim 1 wherein the adjustable optical element comprises a mirror.

5. The optical delay line of claim 4 wherein the mirror is rotated by a rotation mechanism.

6. The optical delay line of claim 5 wherein the rotation mechanism comprises a galvanometer.

7. The optical delay line of claim 4 wherein at least one of the plurality of optical elements is a double-pass mirror.

8. The optical delay line of claim 1 wherein the adjustable optical element comprises a rotating polygonal mirror.

9. The optical delay line of claim 1 wherein the polarization dependent optical element comprises one or more windows disposed substantially at Brewster's angle.

10. The optical delay line of claim 1 wherein the polarization dependent optical elemert comprises a neutral density optical attenuator.

11. The optical delay line of claim 1 wherein the polarization dependent optical element comprises a window having nonparallel front and back surfaces.

12. An optical delay line which comprises:
    a collimator lens system;
    a grating disposed to receive radiation output from the collimator lens system;
    a collector lens system disposed to receive at least a portion of radiation diffracted by the grating;
    a rotatable mirror disposed substantially at a back focal plane of the collector lens system;
    a reflector disposed to reflect at least a portion of radiation diffracted by the grating; and
    a polarization compensation window disposed in a path of radiation passing through the optical delay line, which polarization compensation window produces polarization dependent transmission that compensates for polarization dependence of the grating.

13. The optical delay line of claim 12 wherein the polarization compensation window comprises one or more windows disposed substantially at Brewster's angle.

14. The optical delay line of claim 12 wherein the polarization compensation window comprises a neutral density optical attenuator.

15. The optical delay line of claim 12 wherein the polarization compensation window comprises a window having nonparallel front and back surfaces.

16. An optical delay line which comprises:
    a collimator lens system;
    a grating disposed to receive radiation output from the collimator lens system;

a collector lens system disposed to receive at least a portion of radiation diffracted by the grating;

a rotatable mirror disposed substantially at a back focal plane of the collector lens system;

a reflector disposed to reflect at least a portion of radiation diffracted by the grating; and a polarization compensation window disposed in a path of radiation passing through the optical delay line; wherein:

the collimator lens system, the reflector, and an output end of an optical fiber are affixed in a unit, which unit is movable by a translation mechanism.

17. An optical delay line which comprises:

a collimator lens system;

a grating disposed to receive radiation output from the collimator lens system;

a collector lens system disposed to receive at least a portion of radiation diffracted by the grating;

a rotatable mirror disposed substantially at a back focal plane of the collector lens system; and a reflector disposed to reflect at least a portion of radiation diffracted by the grating;

wherein the collimator lens system, the reflector, and an output end of an optical fiber are affixed in a unit, which unit is movable by a translation mechanism.

18. An imaging system for imaging a sample comprising:

an optical source capable of producing an optical signal having an optical spectrum;

an interferometer in communication with the optical source;

a detector in optical communication with the interferometer; and an optical delay line in optical communication with the interferometer that comprises a plurality of optical elements in optical communication with each other, wherein: (I) at least one of the plurality of optical elements is capable of spatially dispersing a spectrum of the optical signal to provide a spatially dispersed optical signal, (ii) at least one of the plurality of optical elements is adjustable to affect one or more of a phase delay and a group delay of the optical signal, and (iii) at least one of the plurality of optical elements is a polarization dependent optical element that produces polarization dependent transmission that compensates for polarization dependence of the at least one of the optical elements that is capable of spatially dispersing a spectrum.

19. The imaging system of claim 18, wherein at least one adjustable optical element repeatedly scans to produce a change of optical group delay and a time varying optical phase delay.

20. The system of claim 19, further comprising a signal processing unit in electrical communication with the detector and wherein the adjustable optical element is repetitively scanned, and the signal processing unit compensates any for non-uniform rate of change of phase delay.

21. The imaging system of claim 19, wherein the spatially dispersive element comprises a diffractive element.

22. The imaging system of claim 19 which further comprises an acousto-optic modulator in optical communication with the optical delay line.

23. The imaging system of claim 19 which further comprises an electro-optic beam deflector in optical communication with the optical delay line.

24. The imaging system of claim 19 wherein the adjustable optical element comprises a polygon scanning mirror.

25. The imaging system of claim 19 wherein the spatially dispersive element has a periodic optical structure with an adjustable period, the spatially dispersive element angularly dispersing the optical signal.

26. The imaging system of claim 19 wherein at least one of the plurality of optical elements is a double-pass mirror.

27. The imaging system of claim 18 wherein the polarization dependent optical element comprises one or more windows disposed substantially at Brewster's angle.

28. The imaging system of claim 18 wherein the polarization dependent optical element comprises a neutral density optical attenuator.

29. The imaging system of claim 18 wherein the polarization dependent optical element comprises a window having nonparallel front and back surfaces.

30. A scanning optical coherence tomography imaging system comprising:

an optical source capable of producing an optical signal having an optical spectrum;

an interferometer in communication with the optical source;

a detector in optical communication with the interferometer;

a signal processor in electrical communication with the detector;

an optical delay line comprised of optical elements that is in optical communication with the interferometer, wherein (I) at least one of the optical elements is capable of spatially dispersing the optical signal, and (ii) at least one optical element is a polarization dependent optical element that produces polarization dependent transmission to compensate for polarization dependence of the at least one of the optical elements that is capable of spatially dispersing, and the optical delay line further comprises a scanning device capable of adjusting at least one of the optical elements to control an optical group delay; and wherein: (I) the interferometer interferometrically combines the delayed optical signal with a portion of the optical signal scattered by a sample, (ii) the detector detects the interferometrically combined signal to produce one or more of a substantially zero frequency heterodyne signal and a substantially non-zero frequency heterodyne signal in response thereto, and (c) the signal processor produces images of the sample in response to the zero frequency heterodyne signal or non-zero frequency heterodyne signal, respectively.

31. The scanning optical coherence tomography imaging system of claim 30 wherein the polarization dependent optical element comprises one or more windows disposed substantially at Brewster's angle.

32. The scanning optical coherence tomography imaging system of claim 30 wherein the polarization dependent optical element comprises a neutral density optical attenuator.

33. The scanning optical coherence tomography imaging system of claim 30 wherein the polarization dependent optical element comprises a window having nonparallel front and back surfaces.

34. An imaging system for imaging a sample comprising:

an optical source capable of producing an optical signal having an optical spectrum;

an interferometer in communication with the optical source;

a detector in optical communication with the interferometer; and an optical delay line which comprises: (i) a collimator lens system; (ii) a grating disposed to receive radiation output from the collimator lens system; (iii) a collector lens system disposed to receive at least a portion of radiation diffracted by the grating; (iv) a rotatable mirror disposed substantially at a back focal plane of the collector lens system; and (v) a reflector disposed to reflect at least a portion of radiation diffracted by the grating; wherein the collimator lens system, the reflector, and an output end of an optical fiber are affixed in a unit, which unit is movable by a translation mechanism.

* * * * *